Patented Sept. 9, 1930

1,775,360

UNITED STATES PATENT OFFICE

WILLIAM H. WILLIAMS, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING ARYLAMINES

No Drawing.  Application filed April 27, 1927. Serial No. 187,121.

Various attempts have been made to prepare arylamines from the corresponding halogenated aromatic hydrocarbon derivatives by direct reaction between the latter and ammonia at an elevated temperature and corresponding high pressure, but, so far as we are aware, no commercial success has attended efforts heretofore made along this line. In the main such failure may be attributed to the inability to secure a proper yield of the desired end product, so that the process is unprofitable. In certain cases where a relatively high yield has been obtained it has been found upon trial that the reacting mixture has such a destructive effect on the containers or apparatus in which the process is conducted as to render such processes impracticable.

In U. S. Patent 1,762,172 to the present applicant and Joseph W. Britton there is disclosed a method directed to the preparation of aniline or phenylamine ($C_6H_5.NH_2$) as well as various other arylamines from the corresponding halogenated benzene, for example, in the case of such aniline from chlorobenzene, by a process of the general type described above wherein the reaction, however, is greatly promoted and a much higher yield of such arylamine obtained by addition to the reaction mixture of certain ingredients that apparently have the effect of a catalyst.

Briefly described the process consists in reacting the corresponding halogenated hydrocarbon and aqueous ammonia solution in the presence of a cuprous compound, whereby a mixture of arylamine and an aqueous solution of various copper compounds and certain ammoniacal-copper compounds is produced, then adding a caustic compound to such mixture or to the respective aqueous and oily layers into which it separates upon standing, and thereafter in repeating the process, using the precipitate resulting from the action of the caustic compound on such copper compounds for the cuprous compound originally employed to promote the reaction.

In carrying out the foregoing process, or for that matter any process involving a reaction between a halogenated hydrocarbon and aqueous ammonia solution, one of the side products formed in addition to the desired mono-arylamine is the corresponding diaryl compound, for example in the case of the process for making aniline specifically a small amount of diphenylamine, $(C_6H_5)_2NH$, is formed as such a side product. To whatever extent such side product is formed, the yield of the desired end product is of course reduced.

I have now discovered that, when the diarylamine thus produced is removed from the reaction products and re-introduced into the system halogenated benzene plus aqueous ammonia solution, it exercises a marked favorable influence upon the production of the desired mono-arylamine. As a result the system is maintained in an approximate state of balance with respect to such diarylamine and the yield of the desired primary arylamine is measurably increased.

To the accomplishment of the foregoing and related ends, the invention, then, consists of the steps hereinafter fully described and particularly pointed out in the claims, the following description setting forth but one of the various ways in which the principle of the invention may be used.

The following is given as a specific example of the procedure involved in carrying out the present improved method or process for the making of aniline, viz:—

In starting the operation, a suitable quantity of chlorobenzene is mixed with a 25 to 30 per cent. aqueous ammonia solution in such amount as to furnish from 4 to 5 mol. of anhydrous ammonia to one mol. of chlorobenzene. This mixture is then charged with from 0.1 to 0.2 mol. of cuprous oxide, hydroxide, or chloride, or a mixture thereof, (the cuprous oxide or hydroxide being preferred) into a suitable closed reaction chamber, such as an iron autoclave capable of withstanding a working pressure as high as several thousand pounds, and the mixture thereupon heated with stirring to a temperature of from 150 to 250 degrees C. and with a corresponding pressure, viz, from 500 to 1500 pounds. The time of heating will vary with the temperature and pressure thus applied from 12 hours for the lower temperature to from 4 to 5 hours at the higher temperature.

The general reaction that occurs may be represented by the following equation, viz:—

$$C_6H_5Cl + 2NH_3 \rightarrow$$
$$C_6H_5.NH_2 + HCl + NH_3 \rightarrow$$
$$C_6H_5.NH_2 + NH_4Cl.$$

A certain amount of phenol will be simultaneously formed by hydrolysis of the chlorobenzene and a small amount of diphenylamine, $(C_6H_5)_2.NH$, is also formed as a side product; while the excess ammonia will remain of course, as well as any unreacted chlorobenzene. In addition to reacting with the latter, the ammonia and ammonium chloride react with the cuprous oxide, hydroxide, or chloride introduced into the reaction mixture as aforesaid to yield certain copper-ammoniacal compounds that, as indicated above, constitute upon proper treatment a catalyst possessing significant properties.

Upon completion of the reaction in the first or main stage of the operation, the products still in the form of a liquid mixture resulting therefrom are discharged under pressure of the ammonia gas in the autoclave into a suitable closed vessel for removal first of the free ammonia and then for the treatment of the other ingredients in such mixture as will now be described. These ingredients will include the aniline oil containing unreacted chlorobenzene with some phenol as well as some diphenylamine; also the water from the aqueous solution of ammonia which will contain ammonium chloride with any excess of ammonia present. There will also be dissolved in such aqueous solution and to a certain extent in the aniline oil the above-mentioned copper-ammoniacal compounds.

The treatment of the foregoing mixture of ingredients and products resulting from the reaction for the recovery of the aforesaid catalytic material forms no part of the present invention and need not be further described than to state that it involves the addition either to the unseparated mixture, or to one or both of the oily and aqueous layers into which such mixture separates upon standing, of a caustic compound, using this term to include the oxide, hydroxide or equivalent compound of an alkaline earth metal as well as an alkali metal. After treatment either of the mixture as a whole or of the oily (aniline) layer with such caustic compound, the resulting material is next subjected to distillation, preferably steam distillation, with the result that the following products are distilled off in the order stated, viz, the freed ammonia, chlorobenzene, aniline and diphenylamine. By fractionating the aniline, not only may the aniline be separated from the chlorobenzene, but also well freed from diphenylamine and the latter separately recovered from the two other products just named, although for the purpose of present process it may remain with the chlorobenzene which is desirably returned to the initial reaction for use over again.

According to the present improved process, upon repeating the reaction between chlorobenzene and aqueous ammonia solution, a certain amount of such recovered diphenylamine is returned or added thereto, it being understood that once the operation has been established, such return is in effect continuously made and the amount of diphenylamine in the reaction mixture is thus at all times maintained at the point where an approximate state of chemical balance with respect to such diphenylamine exists. The formation of more diphenylamine from the reacting ingredients is thus repressed to a marked extent; in other words, the amount of diphenylamine will not be measurably increased as it thus passes and re-passes through the system.

In conclusion it should be stated that my improved process which may be referred to generally as a process for the ammonolysis of halogenated aromatic hydrocarbons, is applicable not merely to aniline or phenylamine, $C_6H_5.NH_2$, but to the production of the homologues of aniline or the various arylamines in general, as illustrated by the following examples, viz:—

1. Dichlorobenzene, $C_6H_4Cl_2$, with ammonium cuprous chloride and copper, readily yields $C_6H_4(NH_2)_2$, phenylenediamine.
2. Chlorotoluene, $CH_3C_6H_4Cl$, similarly yields $CH_3C_6H_4NH_2$, toluidine.
3. Chloronaphthalene, $C_{10}H_7Cl$, similarly yields $C_{10}H_7NH_2$, naphthylamine.
4. Chloroanthraquinone, $C_{14}H_7O_2Cl$, similarly yields $C_{14}H_7O_2NH_2$, amino-anthraquinone.

Certain of the foregoing homologues of aniline or equivalent arylamines, it should further be explained, may not be separable by dry distillation, but in such case separation may be effected by an extraction process using chlorobenzene or equivalent solvent.

Other modes of applying the principle of the invention may be employed, change being made as regards the details disclosed, provided the steps stated in any of the following claims, or the equivalent of such, be employed.

I therefore particularly point out and distinctly claim as my invention:—

1. In a method of making a primary arylamine by reacting between the corresponding halogenated aromatic hydrocarbon and aqueous ammonia, wherein a diarylamine tends to form along with the desired compound, the step which consists in adding such diarylamine to the reaction mixture.

2. In a method of making a primary arylamine by reacting between the corresponding halogenated aromatic hydrocarbon and aqueous ammonia, wherein a diarylamine tends to form along with the desired compound, the step which consists in adding such diarylamine to the reaction mixture in an amount sufficient to maintain the system in an approximate state of chemical balance with respect to such diarylamine, whereby the formation of any substantial additional amount of the latter is prevented.

3. In a method of making a primary arylamine, the steps which consist in reacting between the corresponding halogenated aromatic hydrocarbon and aqueous ammonia in the presence of an ammonolytic catalyst, with the production of the desired monoarylamine, and some diarylamine, removing and separating such arylamines, and returning the diarylamine to the first step.

4. In a method of making aniline by reacting between a mono-halogenated benzene and aqueous ammonia, wherein diphenylamine tends to form, the step which consists in adding such diphenylamine to the reaction mixture.

5. In a method of making aniline by reacting between a mono-halogenated benzene and aqueous ammonia, wherein diphenylamine tends to form, the step which consists in adding such diphenylamine to the reaction mixture in an amount sufficient to maintain an approximate state of balance with respect to such diphenylamine, whereby the formation of any substantial additional amount of the latter is prevented.

6. In a method of making aniline, the steps which consist in reacting between a mono-halogenated benzene and aqueous ammonia in the presence of an ammonolytic catalyst, with the production of the desired aniline and some diphenylamine, removing and separating such amines, and returning the diphenylamine to the first step.

7. The method of making aniline which comprises reacting between chlorobenzene and aqueous ammonia in the presence of a cuprous compound, and restraining the formation of diphenylamine from the reaction components by initially adding such compound to the reaction mixture.

8. The method of making aniline which comprises reacting between chlorobenzene and aqueous ammonia in the presence of a cuprous compound, and restraining the formation of diphenylamine from the reaction components by initially adding such compound to the reaction mixture in an amount sufficient to maintain an approximate state of balance with respect to such diphenylamine, whereby the formation of any substantial additional amount of the latter is prevented.

9. In a method of making aniline, the steps which consist in reacting between chloro-benzene and aqueous ammonia in the presence of a cuprous compound, with the production of the desired aniline and some diphenylamine, removing and separating such amines, and returning the diphenylamine to the first step.

10. In a method involving the ammonolysis of a halogenated aromatic hydrocarbon wherein, in addition to the desired primary amine product, another amino-compound tends to form in equilibrium with such desired product, the step which consists in adding the undesired compound to the reacting ingredients.

11. In a method involving the ammonolysis of a halogenated aromatic hydrocarbon, wherein, in addition to the desired primary amine product another amino-compound tends to form in equilibrium with such desired product, the step which consists in adding the undesired compound to the reacting ingredients in an amount sufficient to maintain the system in an approximate state of balance with respect to such compound.

12. In a method involving the ammonolysis of a halogenated aromatic hydrocarbon, wherein, in addition to the desired primary amine product another amino-compound tends to form in equilibrium with such desired product, the step which consists in adding the undesired compound to the reacting ingredients in an amount approximating that in which such compound would normally form therein.

Signed by me this 25th day of April, 1927.

WILLIAM H. WILLIAMS.